United States Patent
Krohn

(10) Patent No.: US 9,480,243 B2
(45) Date of Patent: Nov. 1, 2016

(54) FISHING LURE JIG

(71) Applicant: Todd Alexander Krohn, Holiday, FL (US)

(72) Inventor: Todd Alexander Krohn, Holiday, FL (US)

(*) Notice: Subject to any disclaimer, the term of this patent is extended or adjusted under 35 U.S.C. 154(b) by 161 days.

(21) Appl. No.: 14/609,378

(22) Filed: Jan. 29, 2015

(65) Prior Publication Data
US 2015/0208624 A1   Jul. 30, 2015

Related U.S. Application Data

(60) Provisional application No. 61/933,329, filed on Jan. 30, 2014.

(51) Int. Cl.
*A01K 85/00* (2006.01)
*A01K 83/00* (2006.01)

(52) U.S. Cl.
CPC .............. *A01K 85/00* (2013.01); *A01K 83/00* (2013.01)

(58) Field of Classification Search
CPC ...... A01K 85/00; A01K 83/00; A01K 85/02; A01K 91/04
USPC ............... 43/42.9, 42.25, 42.37, 42.7, 42.24, 43/42.26, 43.1, 43.15, 43.16, 48.81, 44.83, 43/42.44, 44.86
See application file for complete search history.

(56) References Cited

U.S. PATENT DOCUMENTS

| | | | | |
|---|---|---|---|---|
| 779,843 | A * | 1/1905 | Fredricks | A01K 83/00 43/43.16 |
| 963,860 | A * | 7/1910 | Byrom | A01K 85/00 43/42.11 |
| 1,990,693 | A * | 2/1935 | Hildebrandt | A01K 85/10 24/115 H |
| D192,249 | S * | 2/1962 | Forich | 43/42.37 |
| 3,110,979 | A * | 11/1963 | Woodley | A01K 85/00 43/42.13 |
| 5,600,917 | A * | 2/1997 | Manno | A01K 83/00 43/44.82 |
| 2012/0174468 | A1* | 7/2012 | Nakamichi | A01K 83/00 43/44.81 |
| 2013/0276350 | A1* | 10/2013 | Smith | A01K 85/02 43/42.38 |

FOREIGN PATENT DOCUMENTS

JP   2014168452   * 9/2014

* cited by examiner

*Primary Examiner* — Monica Williams
*Assistant Examiner* — Magdalena Topolski
(74) *Attorney, Agent, or Firm* — Patent CEO, LLC; Phillip Vales

(57) ABSTRACT

A Fishing Lure Jig is formed firstly about a split ring or keychain ring that has a double wire portion and also a single wire portion. Thus, a fishing hook having a tightly wound rounded end threaded upon the single wire portion can be effectively stuck there so that it can not proceed up and over the double wire portion as the rounded end is too small to ride through both wires (the double wire portion) at the same time. Then a second hook is attached at its rounded end in the double wire portion and a connector hoop is also loaded thereon so that the first hook with the narrow rounded end is stuck between these two. A connection chain is attached to the connector hoop and a ball is attached to the opposite end thereof using a similar mechanism.

18 Claims, 6 Drawing Sheets

FISHING LURE JIG

FIELD OF THE INVENTION

Relating to fishing devices intended to catch aquatic animals; more particularly, relating to fishing lures and other devices used to attract fish in order to catch them.

BACKGROUND OF THE INVENTION

Fishing lures are ubiquitous and come in various sizes and shapes that are designed to attract fish in order to snag them on a hook attached to the lure. Color, shape and other characteristics are important factors in the evaluation of a good fishing lure; this so as to ensure that the fish is drawn inexorably to the lure in order for it to unknowingly bite down on an attached hook and thereby captured.

Typical fishing lures come with one or more hooks that get thrust into the inner mouth surface of an unsuspecting fish as it grabs the lure. As they hang from the fishing line a hook is typically disposed vertically in the water when they are cast therein. However, animals can approach from various directions including from the side of the lure thereby avoiding a downward directed lure. As such, none of the prior art lures deal with the ability of the fish to approach from the side of the lure thereby avoiding the attached deadly hook.

Accordingly, there needs to be some solution to overcome the aforementioned problems.

SUMMARY OF THE INVENTION

The present invention overcomes the deficiencies of the known art and the problems that remain unsolved by providing a Fishing Lure Jig in the embodiments below.

A fishing lure comprising:
a split ring having a wire wrapped around itself so that the wire is double wrapped about a large portion thereof and single wrapped about a small portion thereof
a first fishing hook attached to the large portion of the split ring
a second fishing hook attached to the small portion of the split ring so that it cannot move to the large portion of the split ring;
and an attachment hoop attached to another part of the large portion of the split ring so that the second hook is disposed between the first hook and the attachment hoop.

In another aspect, further comprising:
a connection device attached to the attachment hoop.

In another aspect, wherein the connection device has a first end and second end.

In another aspect, wherein the first end has a first end loop attachment device.

In another aspect, wherein the second end has a second end loop attachment device.

In another aspect, wherein the connection device is a ball chain.

In another aspect, wherein the connection device is attached to the attachment hoop at a first end of the connection device.

In another aspect, wherein the connection device is also attached to a fishing device.

In another aspect, wherein the connection device is attached to the fishing device through an integral hoop on the fishing device.

In another aspect, wherein the fishing device is a fishing ball.

In another aspect, wherein the connection device is attached to a fishing device at a second end of the connection device.

A jig device comprising:
a keychain ring having a single wire portion and a double wire portion
a first fishing hook attached about an integral rounded end to the single wire portion so that it cannot move to the double wire portion; and
a second fishing hook attached about an integral rounded end to the double wire portion.

In another aspect, further comprising:
a holder device connected to the keychain ring double wire portion so that the first fishing hook is disposed between the holder device and the second fishing hook.

In another aspect, further comprising:
an intermediate connector having a first end attached to the holder device.

In another aspect, further comprising:
another holder device attached at a second end of the intermediate connector.

In another aspect, further comprising:
a fishing device attached to the holder device.

A fishing jig device comprising: a single wire turned back on itself and forming a single wire portion and a double wire portion; and a first fishing hook permanently attached about a first integral rounded end of the first fishing hook to the single wire portion using a mounting passage in the first integral rounded end; wherein a diameter of the mounting passage is less than two times a diameter of the single wire.

In another aspect, further comprising a second fishing hook moveably attached about a second integral rounded end of the second fishing hook to the double wire portion.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in each figure. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
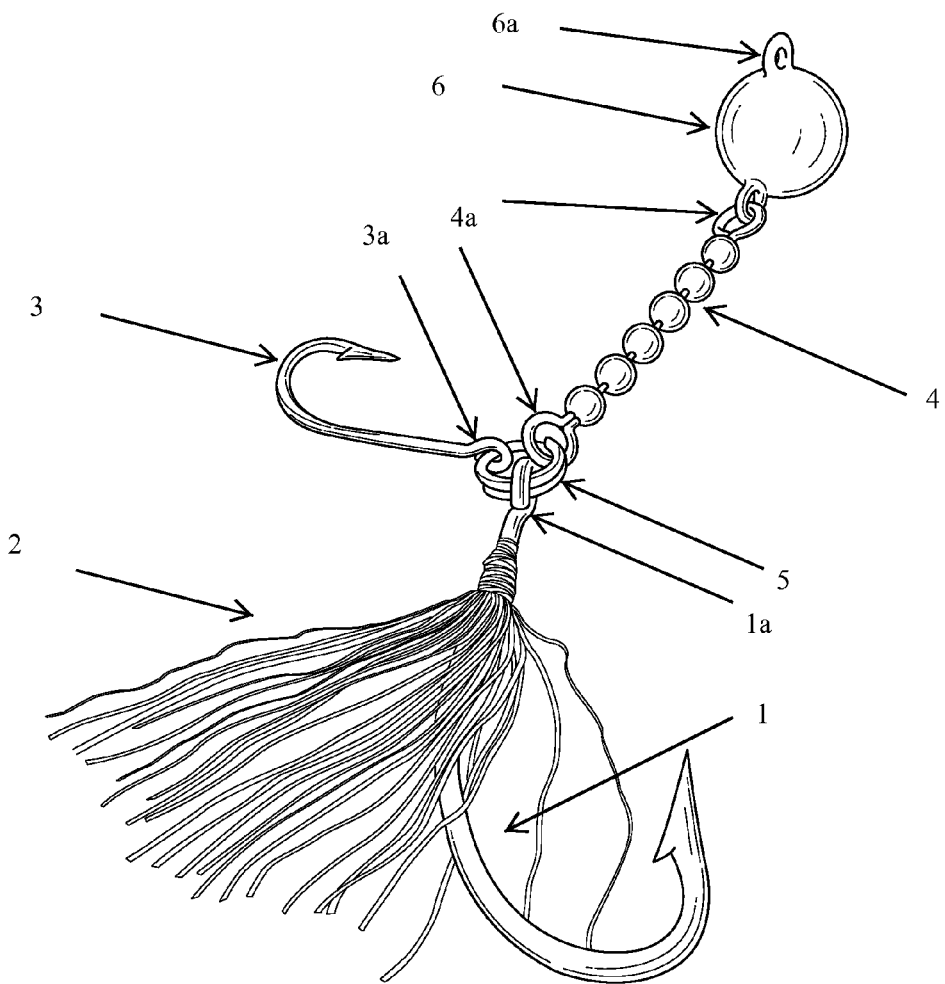
FIG. 1 is a front isometric view of an embodiment of a Fishing Lure Jig as taught herein.

FIG. 1 is a front isometric view of a fishing lure showing an embodiment of a Fishing Lure Jig as taught herein; the various components of the improved fishing lure are now to be discussed with regards to FIG. 1. The Fishing Lure Jig comes with several components: a primary metal bait hook 1; an attracting set of strips of material made from feathers, animal hair, string, tinsel, Kevlar or plastic strips 2; a secondary metal hook 3; a ball chain 4; a metallic ring (keychain type) 5 and an attachment ball 6.

The primary bait hook 1 has a pointed end to load a bait portion thereon and to assist in catching a fish and a rounded circular end 1a that is used to attach other items thereon; the final portion of the hook 1 is turned back onto the length of the hook body thereby creating a round end 1a. An attracting set of strips of material made from feathers, animal hair, string, tinsel, Kevlar or plastic strips 2 are attached to the neck just below the end 1a of the hook 1 by wrapping them about the neck and through the use of an epoxy or adhesive to make a permanent connection.

The end 1a of the hook 1 is attached to a metallic ring 5 (keychain type) by inserting the keyring through the rounded end 1a; this rounded end 1a is large enough to permit the double wire portion of the ring 5 to slide therein. The metallic ring 5 is of the type that folds back over itself having a single and a double wires; thus, there is a portion of the ring 5 that only has a single wire overlapping and a portion of the ring 5 that has a double wire overlapping on itself. This is to be used to practice a significant feature of the embodiments herein. This is described below more completely in that a fishing hook 3 having a tightly wound rounded end 3a threaded upon the single wire portion of ring 5 can be effectively stuck there so that it can not proceed up and over the double wire portion as the rounded end is too small to ride through both wires (the double wire portion) at the same time.

In this regard it should be noted that the secondary hook has a similar shape as the primary hook 1; in other words, the secondary hook 3 has a pointed end to catch a fish thereon and a rounded circular end that is used to attach other items thereon; the final portion of the hook 3 is turned back onto the length of the hook body thereby creating a round end 3a as shown in the figure. This rounded end 3a is attached to the metallic ring 5 by opening the overlapping ring portions, sliding the rounded end 3a on the wire making the ring 5 and locating the rounded end 3a on the single wire portion of the ring 5. Thus, the hook 3 has its rounded end 3a threaded onto the ring 5 wire and is located on the single wire portion thereof.

This has the effect that when in the water the hook 3 bounces between the rounded attachment portion 4a of the ball chain 4 that is also threaded onto the ring 5 and the double edge of the ring 5 located on the opposite side of rounded end 3a far from the attachment portion 4a; it should be understood that the other double edge of the ring 5 is located on the other side of the rounded attachment portion 4a of the ball chain 4. This has an intended effect of ensuring that the secondary hook 3 will bob and jerk about from its elevated position so as to facilitate the catching of the fish; the motion is somewhat chaotic but a clear rotational motion has been observed that clearly helps catch the fish when it grabs the bait on primary hook 1. Also, since the rounded end 3a of the secondary hook is narrow it stays on the single wire portion of 5 and does not travel up onto the two wire overlapping portion of ring 5 but stays trapped on the single portion between 4a and one of the double edges of 5.

However, it should be understood that if the other double edge (on the other side of 4a) of the ring 5 travels into 4a that the dynamic of the motion still provides for a displacement between the small hook 3 and the larger hook 1. Thus, the primary feature herein is that the hook end 3a is situated on the single ring portion of the overlapping double ring 5; this because the fish who approaches this arrangement can be hooked from different angles of attack far separate from one another.

Continuing the discussion of the device, a ball chain 4 has two rounded connectors 4a at either end; the first connector 4a of this type, is inserted as discussed above whilst the second is attached to a rounded connection protrusion 6a of an attachment ball 6 that has this rounded connection perforation in the protrusion 6a. The ball 6 is made from plastic, metal or similar materials and filled with a suitable material such as plastic, sand, air or whatever material is suitable for the implementation.

Figure 2:
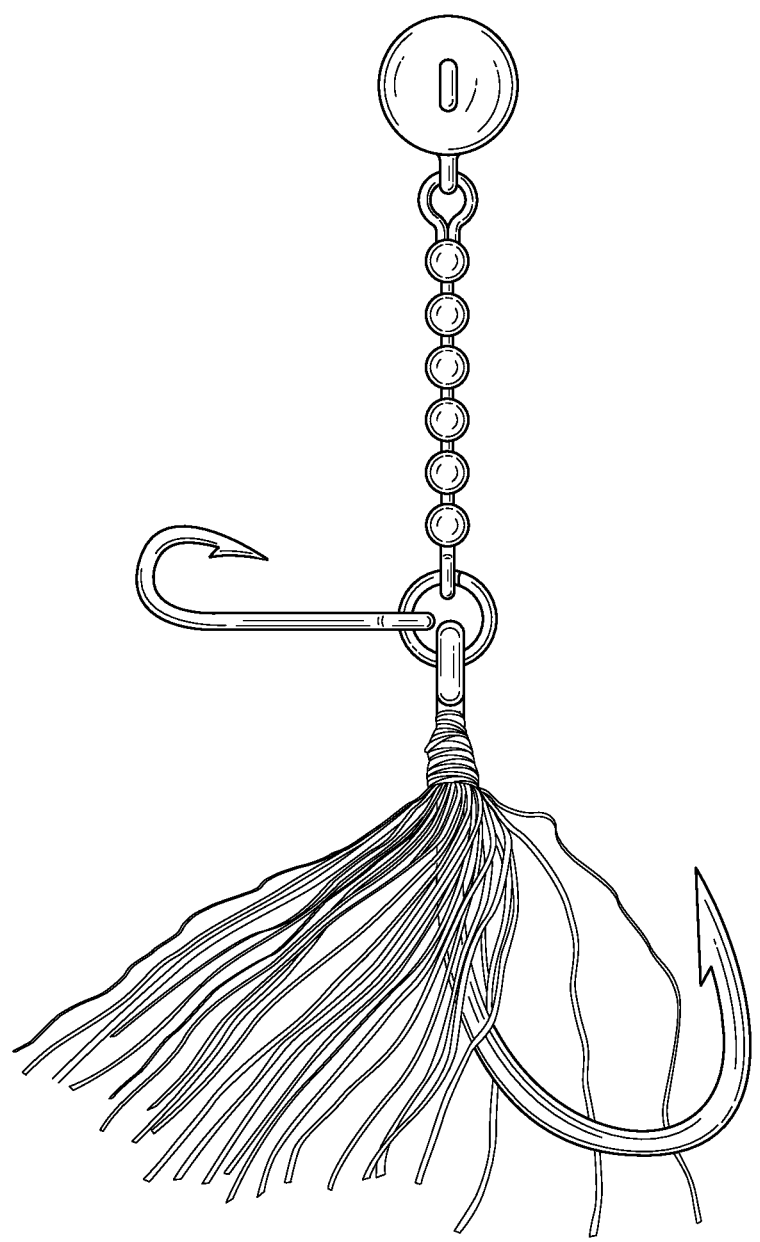
FIG. 2 is a front elevational view of an embodiment of a Fishing Lure Jig as taught herein.
Figure 3:
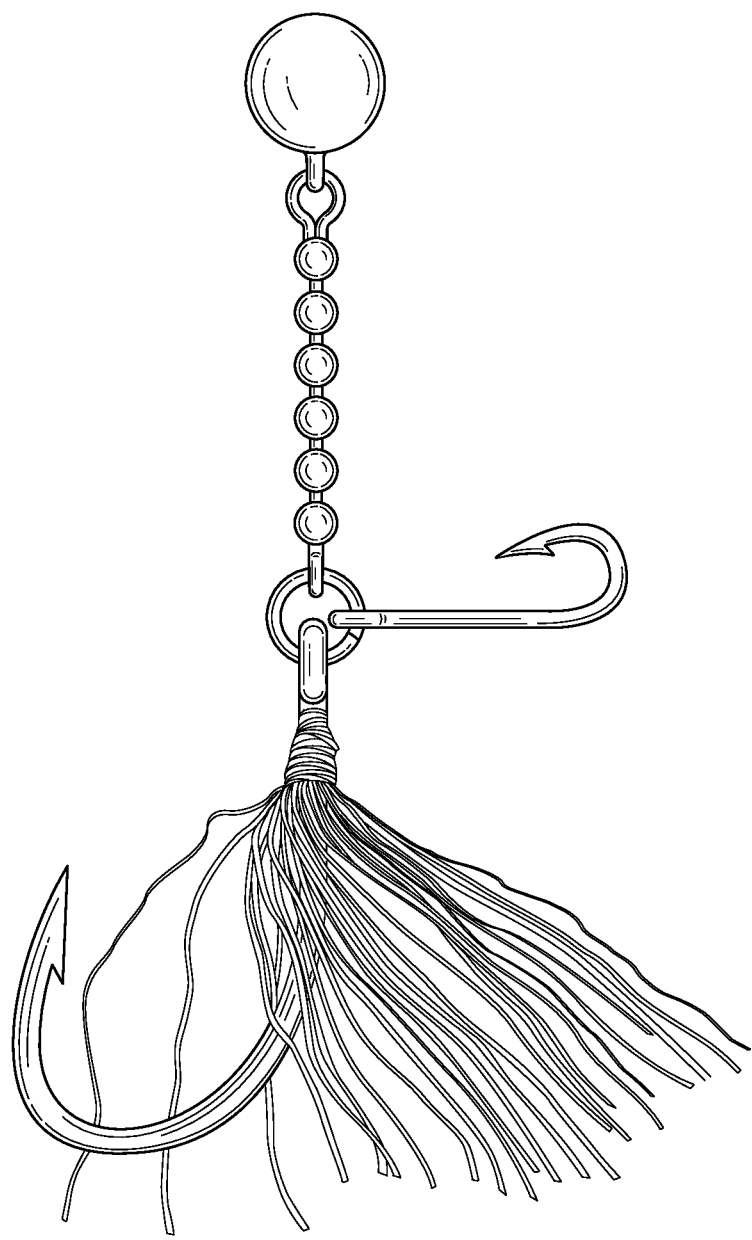
FIG. 3 is a rear elevational view of an embodiment of a Fishing Lure Jig as taught herein.
Figure 4:
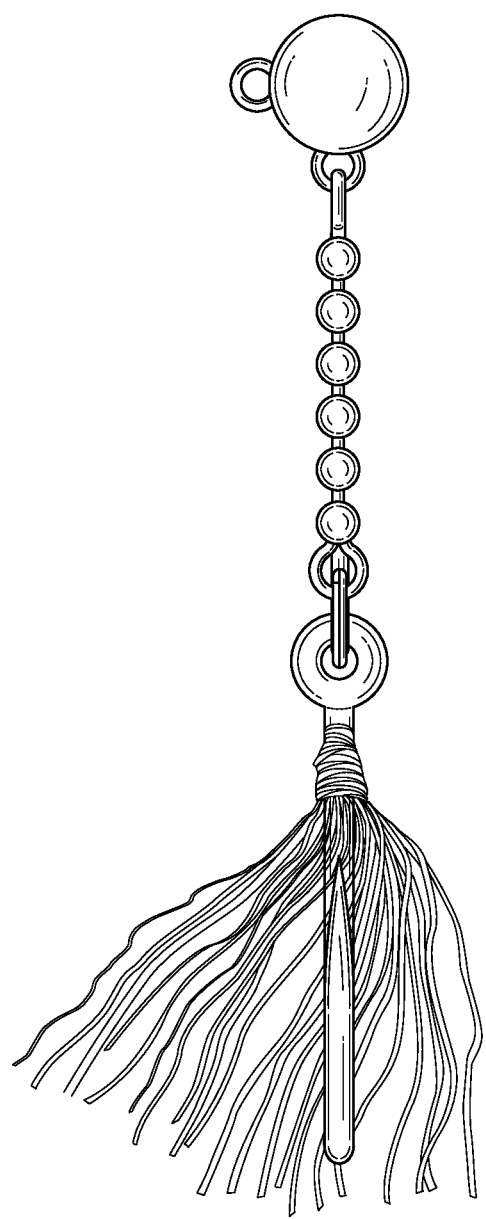
FIG. 4 is a right side elevational view of an embodiment of a Fishing Lure Jig as taught herein.
Figure 5:
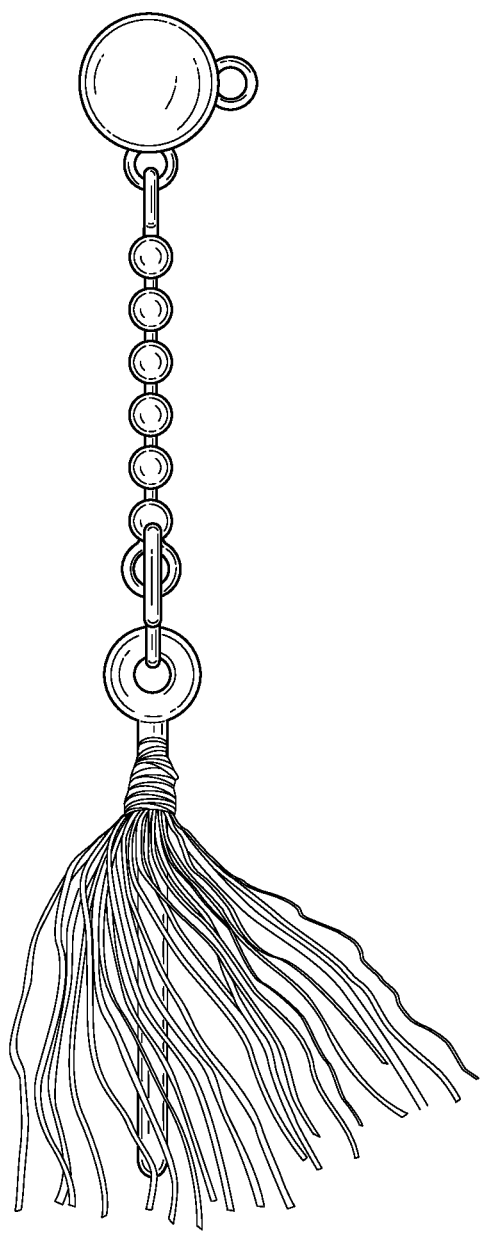
FIG. 5 is a left side elevational view of an embodiment of a Fishing Lure Jig as taught herein.
Figure 6:
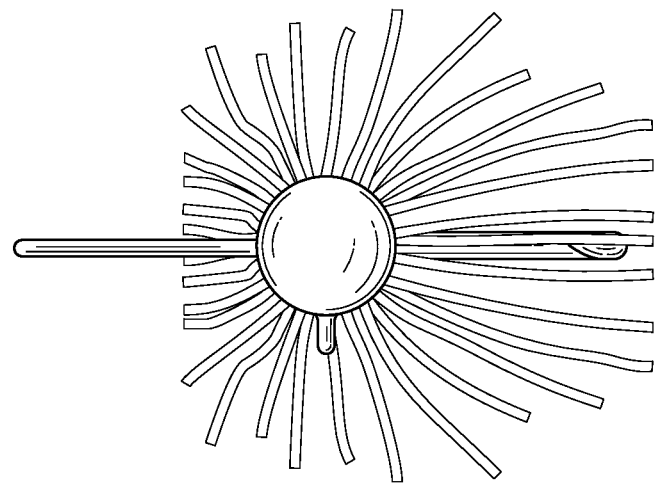
FIG. 6 is a top plan view of an improved fishing lure in an embodiment of a Fishing Lure Jig as taught herein.
Figure 7:
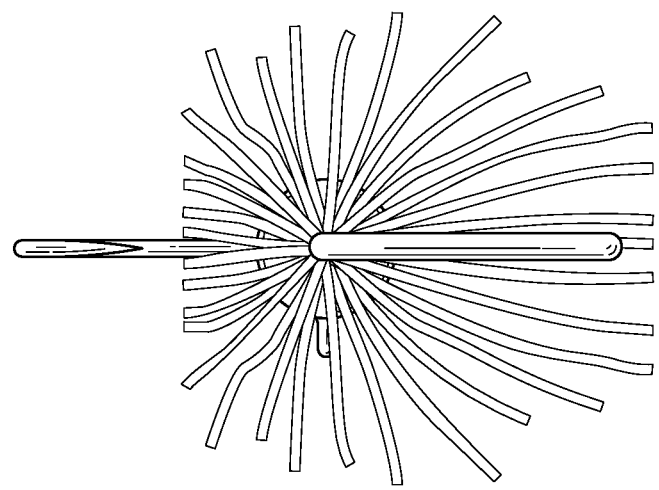
FIG. 7 is a bottom plan view of an improved fishing lure in an embodiment of a Fishing Lure Jig as taught herein.

FIG. 2 is a front elevational view of an embodiment of a Fishing Lure Jig as taught herein;

FIG. 3 is a rear elevational view of an embodiment of a Fishing Lure Jig as taught herein;

FIG. 4 is a right side elevational view of an embodiment of a Fishing Lure Jig as taught herein;

FIG. 5 is a left side elevational view of an embodiment of a Fishing Lure Jig as taught herein;

FIG. 6 is a top plan view of an embodiment of a Fishing Lure Jig as taught herein; and FIG. 7 is a bottom plan view of an embodiment of a Fishing Lure Jig as taught herein.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A fishing lure comprising:
a split ring having a wire wrapped around itself so that the wire is double wrapped about a large portion thereof and single wrapped about a small portion thereof;
a first fishing hook attached to the large portion of the split ring;
a second fishing hook attached to the small portion of the split ring so that it cannot move to the large portion of the split ring;
and an attachment hoop attached to another part of the large portion of the split ring so that the second hook is disposed between the first hook and the attachment hoop.

2. The fishing lure of claim 1, further comprising:
a connection device attached to the attachment hoop.

3. The fishing lure of claim 2, wherein the connection device has a first end and second end.

4. The fishing lure of claim 3, wherein the first end has a first end loop attachment device.

5. The fishing lure of claim 3, wherein the second end has a second end loop attachment device.

6. The fishing lure of claim 3, wherein the connection device is a ball chain.

7. The fishing lure of claim 2, wherein the connection device is attached to the attachment hoop at a first end of the connection device.

8. The fishing lure of claim 7, wherein the connection device is attached to a fishing device at a second end of the connection device.

9. The fishing lure of claim 2, wherein the connection device is also attached to a fishing device.

10. The fishing lure of claim 9, wherein the connection device is attached to the fishing device through an integral hoop on the fishing device.

11. The fishing lure of claim 9, wherein the fishing device is a fishing ball.

12. A jig device comprising:
a keychain ring having a single wire portion and a double wire portion;
a first fishing hook attached about an integral rounded end to the single wire portion so that it cannot move to the double wire portion; and
a second fishing hook attached about an integral rounded end to the double wire portion.

13. The jig device of claim 12, further comprising:
a holder device connected to the keychain ring double wire portion so that the first fishing hook is disposed between the holder device and the second fishing hook.

14. The jig device of claim 13, further comprising:
an intermediate connector having a first end attached to the holder device.

15. The jig device of claim 14, further comprising:
another holder device attached at a second end of the intermediate connector.

16. The jig device of claim 15, further comprising:
a fishing device attached to the holder device.

17. A fishing jig device comprising: a single wire turned back on itself and forming a single wire portion and a double wire portion; and a first fishing hook permanently attached about a first integral rounded end of the first fishing hook to the single wire portion using a mounting passage in the first integral rounded end; wherein a diameter of the mounting passage is less than two times a diameter of the single wire.

18. The fishing jig device of claim 17, further comprising a second fishing hook moveably attached about a second integral rounded end of the second fishing hook to the double wire portion.

* * * * *